United States Patent [19]

Martin et al.

[11] Patent Number: 4,948,337

[45] Date of Patent: Aug. 14, 1990

[54] AIRCRAFT ENGINE PROPULSOR BLADE PITCH SENSING

[75] Inventors: Anthony N. Martin, Simsbury; Robert G. Bartle, Glastonbury, both of Conn.

[73] Assignee: United Technologies Corporation, Hartford, Conn.

[21] Appl. No.: 345,938

[22] Filed: May 1, 1989

[51] Int. Cl.$^5$ ............................................ B64C 11/44
[52] U.S. Cl. ........................................ 416/3; 416/147; 416/153; 416/89
[58] Field of Search ................... 416/3, 35, 61, 87, 89, 416/98, 104, 106, 107, 114, 115, 128, 147, 153, 154, 155, 129, 48; 73/862.36

[56] References Cited

U.S. PATENT DOCUMENTS

| | | | |
|---|---|---|---|
| 3,997,131 | 12/1976 | Kling | 416/129 |
| 4,161,658 | 7/1979 | Patrick | 416/48 |
| 4,556,366 | 12/1985 | Sargisson et al. | 416/155 |
| 4,589,611 | 5/1986 | Ramme et al. | 416/20 R |
| 4,882,936 | 11/1989 | Garshelis | 73/862.36 |

Primary Examiner—Edward K. Look
Assistant Examiner—Hoang Nguyen
Attorney, Agent, or Firm—Donald W. Muirhead

[57] ABSTRACT

Pitch of a blade (12) on an aircraft engine propulsor (14) is determined by employing a shaft (22) and a bevel gear (23) to alter relative circumferential distance between a first set of teeth (25) and a second set of teeth (26). Said teeth (25,26) creates fluctuations in a magnetic field generated by a magnetic poll piece (28a) wherein said fluctuations are converted to a signal (30) by a coil (28) located on a subsequent engine section (8). The time between pulses of the signal (30) is a function of said relative circumferential distance whereby the time between pulses is a function of the pitch of the blade (12).

4 Claims, 2 Drawing Sheets

AIRCRAFT ENGINE PROPULSOR BLADE PITCH SENSING

DESCRIPTION

1. Technical Field

This invention relates to sensing aircraft engine propulsor blade pitch and more particularly to sensing aircraft engine propulsor blade pitch without employing electronic/electromechanical devices in the propulsor.

2. Background Art

An aircraft engine propulsor is comprised of a plurality of blades which are connected to a hub. Rotation of the propulsor causes air to flow in a direction which is perpendicular to the hub's plane of rotation. The propulsor thrust generated is a function of propulsor rotation speed and the pitch of the blades.

Proper operation of many types of aircraft engine propulsors requires that the pitch of the propulsor blades be adjustable so that it is possible to establish the most efficient propulsor rotational speed while changing the amount of propulsor thrust. The ability to adjust propulsor blade pitch, however, requires constant measurement of the pitch of the blades.

There are many electromechanical devices, such as resolvers, potentiometers, etc., available for measuring propulsor blade pitch. All of these devices, however, require the placement of relatively fragile electronic and/or electromechanical devices in the propulsor where they will be subject to high vibrations, high G loads, high temperature, and a fine oil mist which lubricates the propulsor's moving parts during operation.

It is possible "harden" the devices and make them impervious to the hostile environment inside the propulsor, but doing so would be costly. Furthermore, no amount of hardening is guaranteed and it would be necessary to design in backup elements in case the primary elements failed during operation. This would add even more to the cost.

DISCLOSURE OF INVENTION

Objects of the invention include reliable and economical aircraft engine propulsor blade angle measurement which does not require the placement of fragile electronic and/or electromechanical devices in the propulsor.

According to the present invention, blade pitch of an aircraft engine propulsor is determined by measuring time between pulses of a signal generated by a magnetic field-to-signal converter located on an aircraft engine section which is adjacent to said propulsor wherein the time between pulses is determined by relative positioning of magnetic field fluctuation inducers on said propulsor, said relative positioning being controlled by a mechanical linkage to a propulsor blade.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 1:
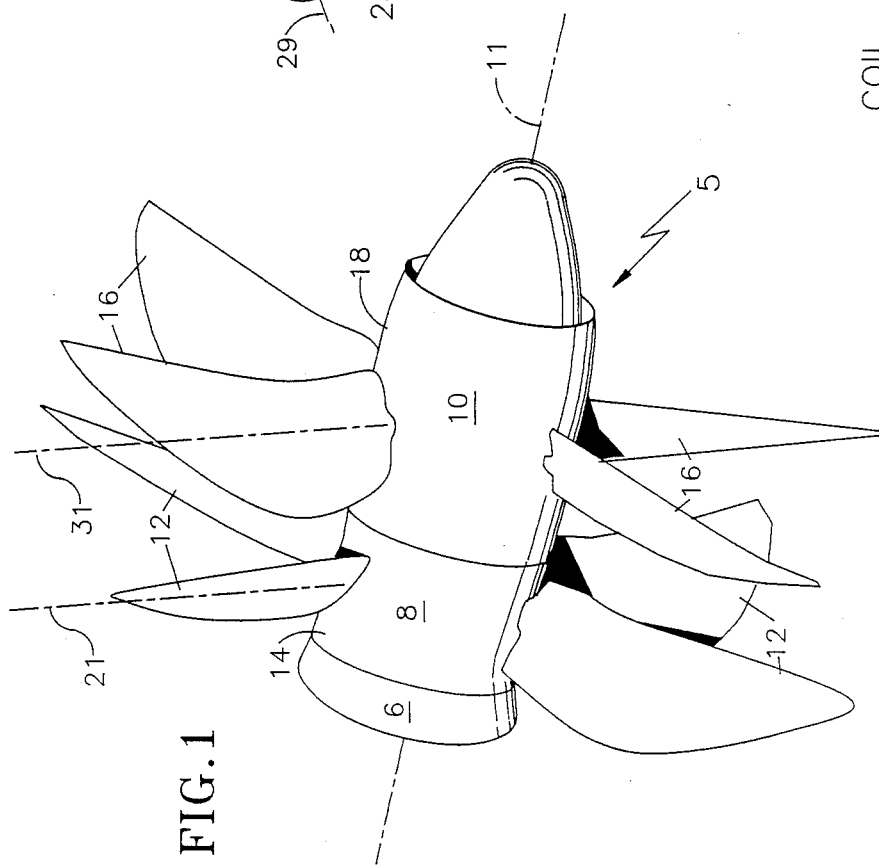
FIG. 1 is a perspective view of a dual propulsor propfan engine.

Referring to FIG. 1, a dual propulsor propfan engine 5 is comprised of a non-rotating section 6, a fore propulsor 8, and an aft propulsor 10. The fore propulsor 8 and the aft propulsor 10 rotate in opposite directions about a common propulsor axis 11. The planes of rotation of the propulsors (not shown) are perpendicular to the propulsor axis 11. The fore propulsor 8 is comprised of a plurality of blades 12 attached to a fore hub 14. Similarly, the aft propulsor 10 is comprised of a plurality of blades 16 attached to an aft hub 18.

Figure 2:
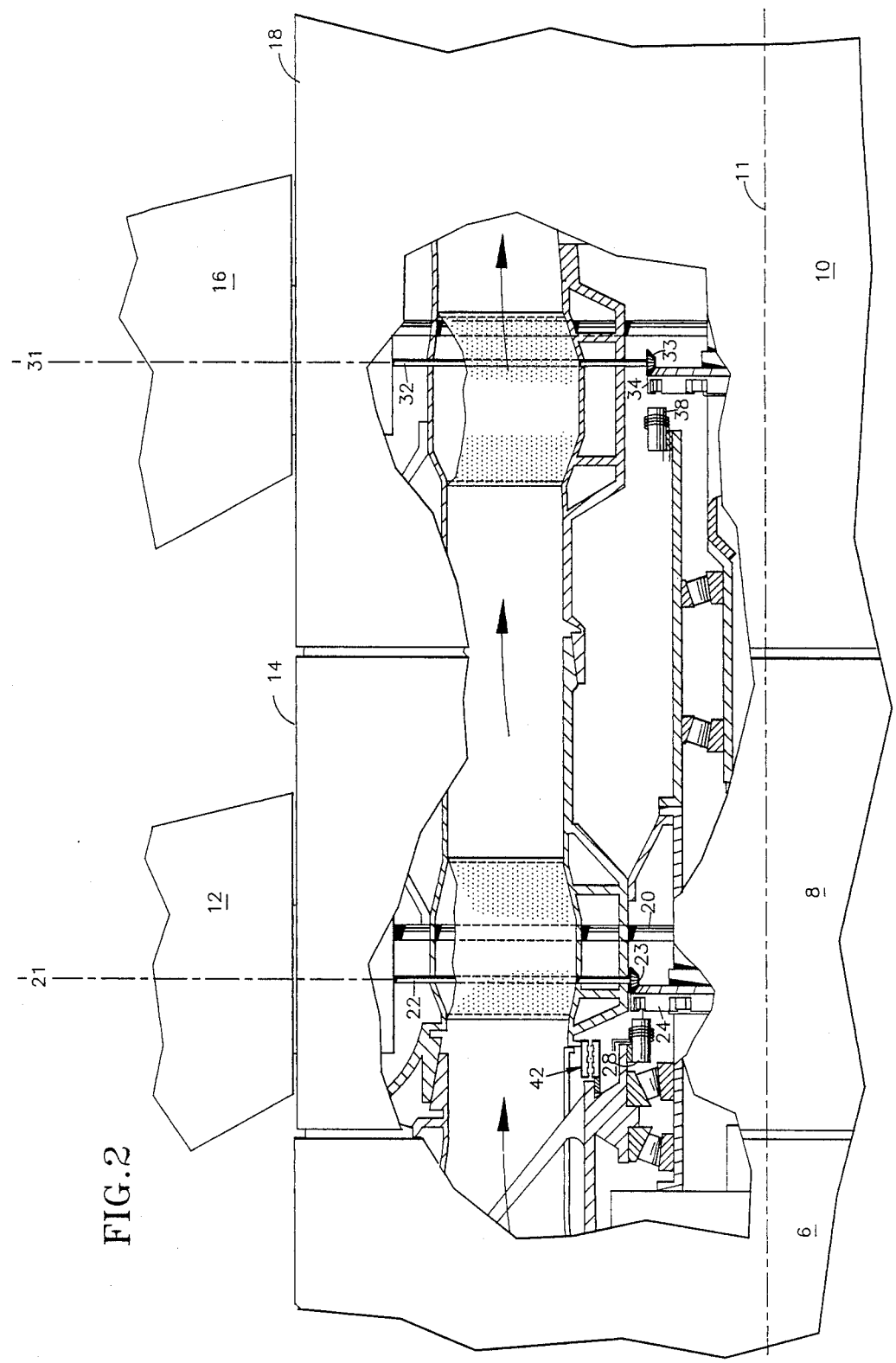
FIG. 2 is an enlarged side view of a dual propulsor propfan engine, partly broken away and partly sectioned.

In FIG. 2, the blade 12 is pitch controlled by a pitch control shaft 20 which is connected to a gear box (not shown) which is connected to the blade 12. Rotation of the pitch control shaft 20 by any well known means results in rotation of the blade 12 about a blade axis 21. Each of the other blades 12 is rotated similarly (not shown) so that all of the blades 12 are always at the same pitch angle. The rotational displacement of the blade 12 is limited to approximately 100 degrees.

A blade angle shaft 22 is connected directly to the blade 12 and is aligned so that the blade axis 21 passes directly through the center of the blade angle shaft 22. Only one blade angle shaft 22 is required for the fore propulsor 14 because all of the blades 12 are always at the same pitch angle.

A bevel gear 23 which is mounted on the end of the blade angle shaft 22 causes a pitch wheel 24 to rotate about the propulsor axis 11 whenever the blade 12 rotates about the blade axis 21. The angular displacement of the pitch wheel 24 is proportional, but not identical, to the angular displacement of the blade 12, said proportion being equal to the number of teeth in the bevel gear 23 divided by the number of teeth in the pitch wheel 24.

Figure 3:
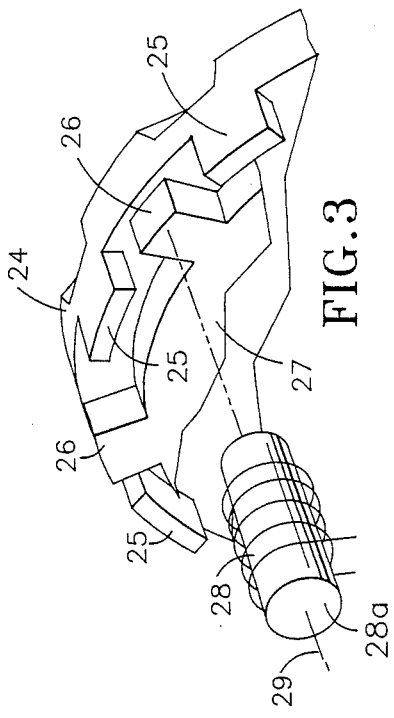
FIG. 3 is a perspective view of a pitch wheel, a fixed wheel, and a coil.

In FIG. 3, the pitch wheel 24 has a plurality of pitch tabs or teeth 25 which intermesh with a plurality of fixed tabs or teeth 26 on a fixed wheel 27. As the propulsor 14 rotates, the tabs 25,26 form a circumferential path by revolving about the propulsor axis 11.

The fixed wheel 27 maintains a constant angular displacement with respect to the propulsor 14 and is not effected by pitch changes of the blade 12. Therefore, as the blade 12 changes pitch, the distance along the circumferential path (circumferential distance) between the pitch tabs 25 and the fixed tabs 26 also changes. There will be a unique relative circumferential distance between the pitch tabs 25 and the fixed tabs 26 for every unique angular displacement of the blade 12.

A magnetic field-to-signal converter, such as a coil 28, is located on the non-rotating section 6 of the propfan engine 5. The coil 28 has a coil axis 29. The coil axis 29 passes through the circumferential path that is made by the tabs 25, 26.

Both the pitch wheel 24 and the fixed wheel 27 are made of ferromagnetic materials in order to act as magnetic field fluctuation inducers. The coil 28 is placed close enough to the tabs 25, 26 so that a magnetic field generated by a magnetic pole piece 28a in the center of the coil 28 is fluctuated by the tabs 25, 26. This fluctuation of the field causes an ac voltage to be generated across the coil 28. The pulses of the ac voltage are used to determine the pitch of the blade 12.

Figure 4:
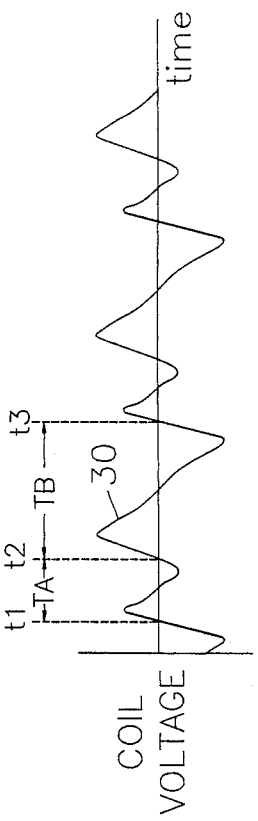
FIG. 4 is a graph of coil voltage vs. time.

A graphical illustration of the voltage across the coil 28 vs. time is shown in FIG. 4 where the horizontal axis of the graph represents time and the vertical axis represents voltage. The point on the vertical axis which is intersected by the horizontal axis corresponds to zero volts.

A waveform 30 crosses the horizontal axis numerous times. The time between subsequent instances of the waveform 30 crossing the horizontal axis by going from negative to positive voltage (positive crossover) corresponds to the time it takes for two successive tabs 25,26 to pass through the coil axis 29. Furthermore, the alternation of pitch tabs 25 and fixed tabs 26 guarantees that a positive crossover generated by a pitch tab 25 will always be followed by a positive crossover generated by a fixed tab 26 and that a positive crossover generated by a fixed tab 26 will always be followed by a positive crossover generated by a pitch tab 25.

In FIG. 4, times t1, t2, and t3 represent three successive positive crossover times. TA is the time interval from t1 to t2 and TB is the time interval from t2 to t3. The gear ratio between the bevel gear 23 and the pitch wheel 24 is chosen so that the pitch tabs 25 never travel more than half way between the fixed tabs 26. Therefore, because the time interval, TA, is shorter than the time interval TB, the positive crossovers at t1 and t3 must correspond to fixed tabs 26 crossing the coil axis 29 while t2 must represent one of the pitch tabs 25 crossing the coil axis.

The pitch of the blade 12 is given by the formula:

Blade Pitch = C * ((TB−TA)/(TB+TA))

where C is a constant, the value of which depends upon the number of teeth in the bevel gear 23, the number of teeth in the pitch wheel 24, and the number of pitch tabs 25 and fixed tabs 26. The above formula works for any rotational speed of the hub 14 because TA and TB change by the same proportion as changes in rotational speed of the hub 14.

A mechanism for detecting pitch of the blade 16 on the aft hub 18 is comprised of a pitch angle shaft 32, a bevel gear 33, a pitch wheel 34, and a coil 38. The blade 16 rotates about an axis 31. Operation of the mechanism is identical to the description herein for detecting the pitch of the blade 12 except that the coil 38 is part of the fore propulsor hub 14 and that therefore an inductive coupling 42 is used to transmit the ac voltage signal generated in the coil 38 to the non-rotating section 6. Furthermore, the signal frequency will be doubled because the fore hub 8 and the aft hub 10 rotate in opposite directions.

Although this invention was illustrated with a dual propulsor propfan engine, it would work just as well for a reciprocating aircraft engine or any other type of aircraft engine which employs a propulsor with variable pitch blades. The number of propulsors employed in an aircraft engine is not critical to this invention. The polarity and exact nature of the waveform 30 in FIG. 4 can be altered by manipulating extraneous parameters (such as the direction of the windings of the coil 28) or by converting magnetic field fluctuation to a different type of signal (such as a current signal).

While this particular embodiment of the invention has been shown using two interlocking ferromagnetic wheels 24, 27, the invention may also be practiced by altering the circumferential distance of any ferromagnetic objects. Even though the coil 28 was shown in this particular embodiment to have a magnetic core, the particular source of the magnetic field is not important to this invention. It is possible to practice this invention without employing ferromagnetic materials by using an external power source to create a magnetic field that is strong enough to create eddy currents in the various parts of the device.

Although the invention has been shown and described with respect to exemplary embodiments thereof, it should be understood by those skilled in the art that various changes, omissions and additions may be made therein and thereto, without departing from the spirit and the scope of the invention.

I claim:

1. A mechanism for determining pitch angle of a blade located on an aircraft engine propulsor, said mechanism comprising:
   means for generating a magnetic field;
   first and second magnetic field fluctuation inducers located on said propulsor and revolving about the axis of rotation of said propulsor for causing fluctuations in said magnetic field;
   a magnetic field-to-signal converter located on an engine section adjacent to said propulsor responsive to said fluctuations in said magnetic field for providing a signal indicative of said fluctuations and;
   a mechanical linkage responsive to changes in the pitch angle of said blade for changing the relative circumferential distance between said first and second magnetic field fluctuation inducers, wherein said relative circumferential distance is a monotonic function of the pitch angle of the blade, whereby said fluctuations vary as a monotonic function of the pitch angle of said blade.

2. A mechanism according to claim 1 wherein said magnetic field is generated by a magnetic pole piece.

3. A mechanism according to claim 1 wherein said magnetic field fluctuation inducers comprise a first ferromagnetic wheel and second ferromagnetic wheel which are disposed coaxially with said propulsor wherein a first set of teeth is disposed about the circumference of said first wheel and a second set of teeth is disposed about the circumference of said second wheel and wherein said first set of teeth is intermeshed with said second set of teeth.

4. A mechanism according to claim 1 wherein said magnetic field-to-signal converter is a coil.

* * * * *